United States Patent [19]

Iwanami et al.

[11] Patent Number: 6,156,836
[45] Date of Patent: Dec. 5, 2000

[54] POLYPROPYLENE RESIN COMPOSITION

[75] Inventors: Kunio Iwanami; Akira Kobayashi; Mitsuhiro Murayama; Yuji Fujita, all of Mie; Takayuki Nagai, Toyota; Takao Nomura, Toyota; Masatoshi Matsuda, Toyota; Osamu Kito, Nisshin; Hisayuki Iwai, Aichi, all of Japan

[73] Assignees: Japan Polychem Corporation, Tokyo; Toyota Jidosha Kabushiki Kaisha, Toyota, both of Japan

[21] Appl. No.: 09/220,440

[22] Filed: Dec. 24, 1998

[30] Foreign Application Priority Data

Dec. 26, 1997 [JP] Japan .................................. 9-369009
Dec. 26, 1997 [JP] Japan .................................. 9-369010

[51] Int. Cl.[7] .............................. C08K 3/34; C08L 53/00; C08L 23/12; C08L 23/16
[52] U.S. Cl. ............................ 524/451; 524/505; 525/89; 525/240; 525/323; 525/324
[58] Field of Search .................................... 524/451, 505, 524/528, 548; 525/89, 98, 240, 322, 323, 324

[56] References Cited

U.S. PATENT DOCUMENTS

| | | | |
|---|---|---|---|
| 4,914,155 | 4/1990 | Shimomura et al. | |
| 5,532,309 | 7/1996 | Fukui et al. | 524/451 |
| 5,684,099 | 11/1997 | Watanabe et al. | 526/135 |
| 5,750,612 | 5/1998 | Zyagawa et al. | 524/451 |
| 5,777,020 | 3/1999 | Nagai et al. | 524/451 |
| 5,880,198 | 3/1999 | Kobayashi et al. | 524/451 |
| 5,914,363 | 6/1999 | Sadatoshi et al. | 524/451 |
| 5,965,654 | 10/1999 | Hirata et al. | 524/451 |

FOREIGN PATENT DOCUMENTS

| | | |
|---|---|---|
| 0 430 490 | 6/1991 | European Pat. Off. . |
| 0 509 662 | 10/1992 | European Pat. Off. . |
| 0 566 141 | 10/1993 | European Pat. Off. . |
| 0 634 453 | 1/1995 | European Pat. Off. . |
| 0 636 650 | 2/1995 | European Pat. Off. . |
| 0 751 160 | 1/1997 | European Pat. Off. . |
| 0 774 489 | 5/1997 | European Pat. Off. . |
| 0 794 225 | 9/1997 | European Pat. Off. . |
| 0 844 281 | 5/1998 | European Pat. Off. . |
| 0 856 555 | 8/1998 | European Pat. Off. . |
| 0 879 853 | 11/1998 | European Pat. Off. . |
| 6-179785 | 6/1994 | Japan . |
| 7-033919 | 2/1995 | Japan . |
| 8-020690 | 1/1996 | Japan . |
| 9316283 | 12/1997 | Japan . |
| 2 281 302 | 3/1995 | United Kingdom . |

*Primary Examiner*—Vasu Jagannathan
*Assistant Examiner*—Callie E. Shosho
*Attorney, Agent, or Firm*—Oblon, Spivak, McClelland, Maier & Neustadt, P.C.

[57] ABSTRACT

This invention provides polypropylene resin compositions which have sharply improved balance of physical properties in comparison with the related polypropylene materials, are materials that can be used in both interior and exterior parts of automobiles, have excellent thin-wall moldability and can sharply reduce generation of flow marks. Particularly, it provides a polypropylene resin composition which comprises specified amounts of (A) a specified ethylene-propylene block copolymer, (B) a specified thermoplastic elastomer and (C) talc, wherein it has specified values of physical properties measured by ASTM and has a degree of b-axis orientation of 720 or more which is calculated from the ratio of differential peak intensities measured by wide-angle X-ray diffraction of the central area of an ASTM No. 1 dumbbell prepared by injection molding.

5 Claims, No Drawings

POLYPROPYLENE RESIN COMPOSITION

FIELD OF THE INVENTION

This invention relates to a polypropylene resin composition which has excellent injection moldability.

BACKGROUND OF THE INVENTION

Since polypropylene shows excellent mechanical properties and moldability while it has low density, it is broadly used in various fields. However, it has inferior impact resistance and heat resistance so that, with the aim of overcoming such problems, various polypropylene resin compositions have been proposed in which an ethylene-propylene copolymer rubber, ethylene-butene copolymer rubber or the like rubber component and talc or the like inorganic filler are added to an ethylene-propylene block copolymer obtained by multi-stage polymerization.

For example, JP-A-1-149845 (the term "JP-A" as used herein means an "unexamined published Japanese patent application") discloses a resin composition which comprises (a) 59 to 74% by weight of a propylene-ethylene block copolymer in which it contains 5 to 12% by weight of a boiling xylene-soluble component having an ethylene content of from 20 to 60% by weight, the ethylene content of the whole polymer is from 1 to 7% by weight and it has a melt flow rate of from 15 to 50 g/10 minutes, (b) 35 to 20% by weight of an ethylene-propylene copolymer rubber having a propylene content of from 20 to 60% by weight and a Mooney viscosity $ML_{1+4}$ (100° C.) of from 100 to 150 and (c) 3 to 6% by weight of talc having a specific surface area of 30,000 $cm^2$/g or more and an average particle size of from 0.5 to 2.0 μm.

In the related polypropylene resin compositions, their impact resistance is improved generally by the addition of a rubber component and their rigidity is improved by the addition of an inorganic filler in general, so that their rigidity is sacrificed for improving impact resistance and their impact resistance is sacrificed for improving rigidity, thus entailing a relatively limited range of the use of each composition. For example, in the case of automobiles, a material having improved impact resistance is used in bumper and the like exterior parts, and a material having improved rigidity is used in instrumental panel and the like interior parts, because there are no polypropylene materials which can be used in both cases. In addition, with the advance in the thinning methods of molded products for the purpose of improving production efficiency and lightening of the products, more superior flow characteristics are in demand for such compositions.

SUMMARY OF THE INVENTION

In view of the above, it therefore becomes a first object of the present invention to provide a material for versatile use which cannot be found in the related art, such as a material that can be used in both interior and exterior parts of automobiles, by improving the balance of its physical properties more greatly than the related materials.

A second object of the present invention is to provide a thin-wall moldability which is superior to those of the related polypropylene resin compositions.

A third object of the present invention is to provide a material capable of sharply reducing flow marks which are generated when the conventional polypropylene based materials are subjected to injection molding.

With the aim of overcoming the aforementioned problems involved in the related art, the inventors of the present invention have conducted intensive studies and found as a result of the efforts that a composition containing, as its main component, a polypropylene which has a specified ratio of differential peak intensities by a wide-angle X-ray diffraction can show excellent mechanical properties and injection moldability and provide excellent surfaces of molded products.

Accordingly, the gist of the present invention resides in a polypropylene resin composition which comprises (A) 54 to 65% by weight of a crystalline ethylene-propylene block copolymer wherein it is an ethylene-propylene block copolymer having a melt flow rate (MFR) of from 60 to 120 g/10 minutes, its homopolypropylene moiety has an isotactic pentad fraction value of 96% or more and an MFR value of from 150 to 250 g/10 minutes and the ratio of its ethylene-propylene copolymer moiety is from 5 to 10% by weight, (B) 17 to 24% by weight of a thermoplastic elastomer comprised of one or a plurality of styrene-ethylene.butylene-styrene block copolymer species and (C) 15 to 25% by weight of talc, wherein it has the following mechanical properties when measured in accordance with the procedures of ASTM modulus in flexure$\geq$1,800 MPa (1,800 MPa or more), tensile yield strength$\geq$20 MPa (20 MPa or more), Izod impact strength at 23° C.$\geq$180 J/m (180 J/m or more), Izod impact strength at −30° C.$\geq$30 J/m (30 J/m or more), Rockwell hardness (R scale)$\geq$74 (74 or more), heat distortion temperature (HDT, 18.5 kg)$\geq$73° C. (73° C. or more), brittleness temperature$\leq$−20° C. (−21° C. or less), and MFR=30 to 60 g/10 minutes, and it has a degree of b-axis orientation of 720 or more which is calculated from the ratio of differential peak intensities by wide-angle X-ray diffraction of the central area of an ASTM No. 1 dumbbell prepared by injection molding.

Other objects and advantages of the present invention will be made apparent as the description progresses.

DETAILED DESCRIPTION OF THE INVENTION

[1] Physical Properties of the Polypropylene Resin Composition

The polypropylene resin composition of the present invention must have a degree of b-axis orientation of 720 or more which is calculated from the ratio of differential peak intensities by wide-angle X-ray diffraction of the central area of an ASTM No. 1 dumbbell prepared by injection molding. In this case, the degree of b-axis orientation is represented by the following formula.

$$b - \text{axis orientation} = \frac{I(040)}{I(110)} \times 100$$

(In the above formula, I(040) means a peak intensity due to the (040) plane at 2θ=13.93 by wide-angle X-ray diffraction, and I(110) means a peak intensity due to the (110) plane at 2θ=16.68 by wide-angle X-ray diffraction.)

The degree of b-axis orientation if less than 720 would cause reduction of strength, brittleness temperature and hardness of injection-molded products.

Also, the polypropylene resin composition of the present invention must satisfy the following mechanical properties when measured in accordance with the procedures of ASTM;

modulus in flexure≧1,800 MPa, tensile yield strength≧20 MPa,

Izod impact strength at 23° C.≧180 J/m,

Izod impact strength at −30° C.≧30 J/m,

Rockwell hardness (R scale)≧74, heat distortion temperature (HDT, 18.5 kg)≧73° C., brittleness temperature≦−20° C., and MFR=30 to 60 g/10 minutes, preferably 40 to 60 g/10 minutes.

If these values are outside the above ranges, the use of the composition becomes narrow, and thin-walled injection moldings cannot be obtained.

In addition, it is desirable that the polypropylene resin composition of the present invention has a tensile elongation of 200% or more.

[2] Components of the Polypropylene Resin Composition

The composition of the present invention is obtained by melt-kneading specified amounts of (A) a specified crystalline ethylene-propylene block copolymer, (B) a specified thermoplastic elastomer and (C) talc. Each of these components is described in the following.

(A) Ethylene-propylene block copolymer

The ethylene-propylene block copolymer (A) to be used in the present invention is comprised substantially of (a) a crystalline propylene polymer moiety and (b) an ethylene-propylene copolymer moiety, but it may further contain a small amount of (c) crystalline ethylene homopolymer moiety.

The crystalline propylene polymer moiety (a) is a homopolymer of propylene which has a melt flow rate (230° C., 2.16 kg load; to be referred to as MFR hereinafter) of from 150 to 250 g/10 minutes and an isotactic pentad fraction (IPF) of 96% or more, preferably 98% or more. The MFR value if smaller than the above range would entail poor moldability and if larger than the range would reduce the physical properties. Also, the IPF value if smaller than the above range would entail insufficient surface hardness which would cause a problem in terms of abrasion resistance, due to decreased degree of b-axis orientation of the whole component.

In this connection, the isotactic pentad fraction (IPF) is the isotactic fraction of pentad unit in the polypropylene molecular chain, which is measured in accordance with the method described in *Macromolecules,* vol. 6, p. 925 (1973), namely by a method in which $^{13}$C-NMR is used. In other words, the isotactic pentad fraction is the fraction of propylene monomer unit existing in the center of chains in which four propylene monomer units are meso-bonded in succession. With regard to the assignment of the peaks, however, it was carried out in accordance with the method described in *Macromolecules,* vol. 8, p. 687 (1975). Illustratively, the isotactic pentad unit was measured as the intensity fraction of the mmmm peak in the total absorption peaks of the methyl carbon region of $^{13}$C-NMR spectrum.

The ethylene-propylene copolymer moiety (b) is an ethylene-propylene random copolymer moiety having low crystalline property. The ethylene content of this ethylene-propylene copolymer moiety is preferably from 25 to 80% by weight, and the ethylene-propylene copolymer moiety may further contain a small amount (about 5 mol % or less) of a third component such as butene-1, octene-1 or the like α-olefin.

The propylene content of this ethylene-propylene copolymer moiety is preferably from 60 to 70% by weight. The propylene content if less than 60% by weight or exceeding 70% by weight would tend to cause reduced ductility.

With regard to the amounts of the crystalline propylene polymer moiety (a) and the ethylene-propylene copolymer moiety (b) in the ethylene-propylene block copolymer (A) having the aforementioned respective moieties, the crystalline propylene polymer moiety (a) content is from 90 to 95% by weight when the total of (a)+(b) is 100% by weight. On the other hand, the ethylene-propylene copolymer moiety (b) content is from 5 to 10% by weight. The copolymer moiety if too large would entail reduction of surface hardness and heat distortion temperature, thus causing a problem of easily making abrasion on the final products.

In addition, the ethylene-propylene block copolymer (A) may have an MFR value of from 60 to 120 g/10 minutes, preferably from 80 to 100 g/10 minutes. The MFR value if less than 60 g/10 minutes would worsen fluidity of the composition, thus entailing worsened moldability, particularly injection moldability, and thus would result in insufficient abrasion resistance. On the other hand, the MFR value if larger than 120 g/10 minutes would cause reduced mechanical strength, which is not desirable.

Such an ethylene-propylene block copolymer (A) can be obtained by a multi-stage polymerization in which the crystalline propylene polymer moiety (a) (propylene homopolymer) is polymerized by one or more steps of the conventional propylene polymerization method and then the ethylene-propylene copolymer moiety (b) is polymerized by one or more steps, and can be produced by a gas phase method, slurry method or the like optional method.

In this connection, the crystalline propylene polymer moiety (a), the ethylene-propylene copolymer moiety (b) and the crystalline ethylene homopolymer moiety (c) can be separated and determined for example by dissolving the ethylene-propylene block copolymer (A) in boiling xylene, cooling the solution, separating the resulting soluble fraction of ethylene-propylene copolymer moiety (b) from the insoluble fraction containing the crystalline propylene polymer moiety (a) and the crystalline ethylene homopolymer moiety (c) and then again heating the insoluble fraction at 100° C. to separate the crystalline propylene polymer moiety (a) as an insoluble fraction.

(B) Thermoplastic elastomer

The thermoplastic elastomer (B) to be used in the present invention is one or a plurality of styrene-ethylene.butylene-styrene block copolymer species (to be referred to as SEBS hereinafter). The SEBS to be used in the present invention is represented by the following structural formula (I).

PS—PEB—PS  (I)

(In the above formula, PS means a polystyrene block and PEB means a polyethylene.butene block.)

Such a type of SEBS is obtained by subjecting styrene and 1,3-butadiene to block copolymerization and hydrogenating the thus prepared copolymer.

The amount of hydrogen to be added to the SEBS may be 90 mol %, preferably having no unsaturated bonds from the weather resistance, recycle performance and the like points of view.

Also, the SEBS may have an MFR value of from 0.5 to 15 g/10 minutes, preferably from 1 to 12 g/10 minutes. When a plurality of SEBS species are used, it is desirable that the SEBS mixture has an MFR value within this range. The MFR value if less than 0.5 g/10 minutes would entail insufficient fluidity, thereby causing worsened moldability and insufficient impact resistance. On the other hand, the MFR value if larger than 15 g/10 minutes would cause insufficient ductility and impact resistance.

In addition, the content of polystyrene moiety which constitutes SEBS is preferably from 10 to 30% by weight. The polystyrene moiety content if less than 10% by weight would worsen impact resistance and if more than 30% by weight would entail insufficient drawing.

(C) Talc

It is desirable that the talc (C) to be used in the present invention has an average particle size of 5 μm or less when measured by a laser diffraction scattering type particle size distribution analyzer. The average particle size of talc if larger than 5 μm would cause insufficient rigidity and dimensional stability. It is also desirable to treat the surface of talc with modified silicone or a titanate coupling agent, because rigidity and heat resistance of the composition can be improved by such a treatment. The talc can also be used by masterbatching it in advance with a portion of the component (A).

Depending on the use of the polypropylene resin composition of the present invention, such as automobile interior and exterior parts, it is desirable to add an antioxidant, a heat stabilizing agent and a light stabilizing agent, each in an approximate amount of from 0.01 to 2 parts by weight, to 100 parts by weight in total of the aforementioned components (A), (B) and (C). The amount of each of these additives if less than 0.01 part by weight would bear no sufficient results and if more than 2 parts by weight would produce no proportionally greater effect but rather reduce physical properties of the polypropylene resin composition.

A phenol compound and a phosphorus compound can be exemplified as the antioxidant to be used. Illustrative examples of the phenol compound include tetrakis-[methylene-3 (3,5-di-t-butyl-4-hydroxyphenyl)propionate] methane, 2,6-di-t-butyl-4-methyl-phenol, tris(3,5-di-t-butyl-4-hydroxyphenyl) isocyanurate and the like.

Illustrative examples of the phosphorus compound include tris(2,4-di-t-butylphenyl) phosphite, 4,4'-butylidene-bis(3-methyl-6-t-butylphenyl-di-tridecyl) phosphite, 1,1,3-tris(2-methyl-4-ditridecyl-phosphite-5-t-butyl) and the like.

Examples of the heat stabilizing agent include sulfur compounds such as distearyl thiopropionate, dilauryl thiopropionate and the like.

Examples of the light stabilizing agent include bis(2,2,6,6-tetramethyl-4-piperidine) sebacate, a condensation product of dimethyl-1 (2-hydroxyethyl)-4-hydroxyl-2,2,6,6-tetramethylpiperidine with succinic acid, poly[{6-(1,1,3,3,-tetramethylbutyl)amino-1,3,5-triazine-2,4-diyl}{2,2,6,6,-tetramethyl-4-piperidyl}imino)hexamethylene{(2,2,6,6,-tetramethyl-4-piperidyl)imino}], N,N'-bis(3-aminopropyl) ethylenediamine-2,4-bis[N-butyl-N-(1,2,2,6,6-pentamethyl-4-piperidyl)amino]-6-chloro-1,3,5-triazine condensate and the like.

In addition to these agents, other additives such as a release agent, an anti-static agent, a plasticizer, an flame retarding agent, a lubricant, a copper inhibitor, an organic or inorganic pigment and a dispersing agent thereof can also be added to the polypropylene resin composition of the present invention, for the purpose of refining the composition.

These additive agents and pigments are added generally at the time of the blending of the aforementioned components, or may be made into a high concentration masterbatch in advance and then blended at the time of injection molding.

[3] Blending Ratio

Amounts of the aforementioned respective components to be blended are (A) 54 to 65% by weight of an ethylene-propylene block copolymer, (B) 17 to 24% by weight of a thermoplastic elastomer and (C) 15 to 25% by weight of talc.

Amount of the ethylene-propylene block copolymer (A) if smaller than 54% by weight would entail reduced rigidity, heat resistance, hardness and the like of the composition and if larger than 65% by weight would result in the reduction of strength, ductility and the like.

Amount of the thermoplastic elastomer (B) if smaller than 17% by weight would entail reduced impact resistance due to high brittleness temperature and if larger than 24% by weight would result in the reduction of strength, rigidity, heat resistance, hardness and the like.

Amount of the talc (C) if smaller than 15% by weight would entail reduced rigidity and heat resistance and if larger than 25% by weight would result in reduced ductility.

[4] Production Method

The polypropylene resin composition of the present invention is produced by dry-blending the aforementioned respective components and then melt-kneading the resulting mixture at a temperature of from 180 to 300° C., preferably from 190 to 210° C., using a single screw extruder, a twin screw extruder, a Banbury mixer, a kneader or the like machine.

EXAMPLES

The following describes the present invention further in detail with reference to inventive and comparative examples which, however, do not restrict the invention. In this connection, the following resins and talc were used as the materials.

[1] Ethylene-propylene Block Copolymer (BPP)

TABLE 1

| BPP | MFR | IPF | MFR of homo PP | Cv | Gv |
|---|---|---|---|---|---|
| (1) | 95  | 99 | 200 | 9 | 50 |
| (2) | 115 | 99 | 240 | 9 | 45 |
| (3) | 90  | 97 | 190 | 9 | 45 |
| (4) | 120 | 99 | 170 | 6 | 50 |
| (5) | 110 | 99 | 160 | 7 | 55 |
| (6) | 50  | 99 | 150 | 9 | 50 |
| (7) | 85  | 95 | 200 | 9 | 50 |
| (8) | 65  | 99 | 130 | 9 | 50 |
| (9) | 120 | 99 | 160 | 4 | 55 |

Note:
<1> MFR: Measured at 230° C. under a load of 2.16 kg by the procedure of ASTM D1238 (unit, g/10 minutes).
<2> Cv: The content of ethylene-propylene copolymer moiety (soluble portion in xylene at ordinary temperature) in ethylene-propylene block copolymer (unit, % by weight).
<3> Gv: The ethylene content of the ethylene-propylene block copolymer moiety (unit, % by weight).
<4> IPF: Measured by $^{13}$C-NMR spectrum analysis.

[2] Thermoplastic Elastomer (1) SEBS

TABLE 2

| Grade | MFR | PS % | Type | Manufacturer |
|---|---|---|---|---|
| G 1652 | 1.6 | 29 | SEBS | Shell Chemicals |
| G 1657 | 8   | 13 | SEBS | Shell Chemicals |
| H 1042 | 5   | 30 | SEBS | Asahi Chemical Industry |
| H 1052 | 12  | 20 | SEBS | Asahi Chemical Industry |

(2) Olefinic thermoplastic elastomer for comparison use

TABLE 3

| Grade | MFR | C2 % | Type | Manufacturer |
|---|---|---|---|---|
| EP 961 SP | 0.8 | 77 | EPR | Japan Synthetic Rubber |
| EBM 2011 P | 1 | 80 | EBR | Japan Synthetic Rubber |

EPR: Ethylene-propylene rubber
EBR: Ethylene-butylene rubber

[3] Talc: MT5D; Manufactured by Fuji Talc (Average Particle Size by Laser Scattering Method=4.5 μm)

Inventive Examples 1 to 13 and Comparative Examples 1 to 11

The aforementioned respective materials were formulated at the ratios shown in Tables 4 and 5, dry-blended using a Super Mixer, put into a continuous kneader (2FCM manufactured by Kobe Steel, L/D=5) and then kneaded under conditions of 200° C., 800 rpm and a discharge rate of 80 kg/hr to obtain pellets. At the time of blending, Ir 1010 (manufactured by Ciba-Geigy) and Mark 2112 (manufactured by Asahi Denka Kogyo) were added, each in 0.1 phr, as antioxidants.

Next, the thus obtained respective pellets were subjected to injection molding using an injection molding machine (NN 350 manufactured by Niigata Engineering; cylinder temperature, 210° C.; die temperature, 30° C.), thereby obtaining test pieces for use in the measurement of physical properties.

Each of the thus obtained test pieces was subjected to the measurement of physical properties and respective tests shown in the following Tables 4 and 5, with the results also shown in the tables.

In addition, using a die of an automobile bumper of t=2.5 mm (for front use, about 2.4 m in total length), a test was carried out on the evaluation of packed conditions and appearances after molding (molded using a 3500 t vertical type injection molding machine manufactured by Ube Industries at a cylinder temperature of 220° C. and at a die temperature of 40° C.), with the results also shown in Tables 4 and 5.

TABLE 4

| | | Inventive Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Material composition | | | | | | | | | | | | | | |
| BPP | Kind | (1) | (1) | (1) | (1) | (1) | (1) | 1) | (1) | (1) | (2) | (3) | (4) | (5) |
| | Wt % | 60 | 60 | 55 | 65 | 65 | 55 | 60 | 60 | 60 | 60 | 60 | 60 | 60 |
| SEBS | Kind | G1652 | G1652 | G1652 | G1652 | G1652 | G1652 | G1652 | H1042 | H1052 | G1652 | G1652 | G1652 | G1652 |
| | Wt % | 20 | 10 | 24 | 17 | 20 | 20 | 20 | 20 | 20 | 20 | 20 | 20 | 20 |
| | Kind | | G1657 | | | | | | | | | | | |
| | Wt % | | 10 | | | | | | | | | | | |
| MT5D | Wt % | 20 | 20 | 21 | 18 | 15 | 25 | 20 | 20 | 20 | 20 | 20 | 20 | 20 |
| Physical properties | | | | | | | | | | | | | | |
| MFR | g/10 min | 45 | 52 | 40 | 46 | 42 | 41 | 66 | 59 | 57 | 46 | 45 | 55 | 53 |
| Tensile yield strength | MPa | 20 | 20 | 20 | 22 | 21 | 21 | 20 | 20 | 20 | 21 | 20 | 21 | 21 |
| Modulus in flexure | MPa | 1900 | 1850 | 1800 | 2100 | 1800 | 2100 | 2000 | 1900 | 1900 | 1900 | 1900 | 1900 | 1950 |
| Bending strength | MPa | 30 | 20 | 27 | 33 | 30 | 30 | 29 | 29 | 29 | 29 | 29 | 29 | 30 |
| 23° C. IZOD | J/m | 230 | 380 | 430 | 180 | 230 | 250 | 460 | 250 | 290 | 200 | 280 | 350 | 230 |
| −30° C. IZOD | J/m | 45 | 50 | 55 | 35 | 50 | 43 | 55 | 46 | 41 | 45 | 45 | 45 | 44 |
| HDT (18.5 kg) | ° C. | 79 | 77 | 74 | 77 | 76 | 82 | 78 | 78 | 78 | 79 | 77 | 79 | 79 |
| Rockwell hardness | R scale | 82 | 78 | 74 | 89 | 82 | 82 | 74 | 75 | 76 | 84 | 79 | 84 | 82 |
| Brittleness temp. | ° C. | −27 | −32 | −35 | −20 | −29 | −23 | −33 | −26 | −26 | −26 | −28 | −30 | −25 |
| b-Axis orientation | | 820 | 830 | 840 | 750 | 730 | 900 | 840 | 840 | 830 | 910 | 850 | 860 | 840 |
| Injection modability | | | | | | | | | | | | | | |
| Filling ability | | good | Good | good | good | good | good | good | good | good | good | good | good | good |
| Appearance | | good | Good | good | good | good | good | good | good | good | good | good | good | good |
| Pencil hardness | | B | 2B | 2B | B | B | B | 2B | 2B | 2B | B | 2B | B | B |
| −20° C. impact test | Rupture | no | No | no | no | no | no | no | no | no | no | no | no | no |

TABLE 5

|  |  | Comparative Examples | | | | | | | | | | |
|---|---|---|---|---|---|---|---|---|---|---|---|
|  |  | 1 | 2 | 3 | 4 | 5 | 6 | 7 | 8 | 9 | 10 | 11 |
| Material composition | | | | | | | | | | | | |
| BPP | Kind | (6) | (7) | (8) | (9) | (1) | (1) | (1) | (1) | (1) | (1) | (1) |
|  | Wt % | 60 | 60 | 60 | 60 | 60 | 60 | 60 | 50 | 70 | 65 | 55 |
| SEBS | Kind | G1652 | G1652 | G1652 | G1652 | G1652 | EP961SP | EP961SP | G1652 | G1652 | G1652 | G1652 |
|  | Wt % | 20 | 20 | 20 | 20 | 10 | 10 | 20 | 30 | 10 | 25 | 15 |
|  | Kind |  |  |  |  | EP961SP | EBM2011P |  |  |  |  |  |
|  | Wt % |  |  |  |  | 10 | 10 |  |  |  |  |  |
| MT5D | Wt % | 20 | 20 | 20 | 20 | 20 | 20 | 20 | 20 | 20 | 10 | 30 |
| Physical Properties | | | | | | | | | | | | |
| MFR | g/10 min | 31 | 45 | 35 | 55 | 40 | 37 | 36 | 29 | 65 | 38 | 46 |
| Tensile yield strength | MPa | 22 | 18 | 21 | 21 | 21 | 22 | 21 | 16 | 25 | 18 | 22 |
| Modulus in flexure | MPa | 1950 | 1700 | 1900 | 1950 | 2000 | 2050 | 2050 | 1300 | 2600 | 1300 | 2800 |
| Bending strength | MPa | 30 | 29 | 29 | 30 | 29 | 30 | 29 | 24 | 34 | 27 | 32 |
| 23° C. IZOD | J/m | 330 | 240 | 250 | 180 | 180 | 120 | 70 | 530 | 100 | 500 | 120 |
| −30° C. IZOD | J/m | 48 | 43 | 43 | 35 | 40 | 35 | 33 | 60 | 29 | 65 | 30 |
| HDT (18.5 kg) | ° C. | 78 | 76 | 78 | 81 | 77 | 75 | 76 | 70 | 88 | 73 | 87 |
| Rockwell hardness | R scale | 82 | 65 | 82 | 82 | 81 | 81 | 80 | 68 | 105 | 67 | 93 |
| Brittleness temp. | ° C. | −30 | −26 | −27 | −12 | −10 | −2 | 5 | −40 | 0 | −40 | −10 |
| b-Axis orientation | | 680 | 540 | 680 | 740 | 760 | 760 | 750 | 740 | 750 | 630 | 820 |
| Injection moldability | | | | | | | | | | | | |
| Filling ability | | short flow mark | Good | short good | good flow mark | good | sink | sink | short flow mark | fin flow mark | good | good flow mark |
| Appearance | | flow mark | good | good | flow mark | good | good | good | flow mark | flow mark | good | flow mark |
| Pencil hardness | | B | 4B | B | 2B | B | B | B | 4B | HB | 4B | B |
| −20° C. impact test | Rupture | no | No | no | yes | yes | yes | yes | no | yes | no | yes |

Note:
<1> MFR: Measured at 230° C. under 2.16 kg load by the procedure of ASTM D1238 (unit, g/10 minutes).
<2> Tensile yield strength: Measured by the procedure of ASTM D638 (unit, MPa).
<3> Modulus in flexure: Measured by the procedure of ASTM D790 (unit, MPa).
<4> Bending strength: Measured by the procedure of ASTM D790 (unit, MPa).
<5> Izod impact strength: Measured at 23° C. and −30° C. by the procedure of ASTM D256 (unit, J/m).
<6> Heat distortion temperature (HDT): Measured under load of 18.5 kg/cm$^2$ by the procedure of ASTM D648 (unit, ° C.).
<7> Rockwell hardness: Measured by the procedure of ASTM D785 (scale, R).
<8> Brittleness temperature: Measured by the procedure of ASTM D746 (unit, ° C.)
<9> b-Axis orientation: Central part of an ASTM No. 1 dumbbell test piece obtained by injection molding is analyzed by wide-angle X-ray diffraction. The orientation was calculated from the ratio of a peak intensity due to the (040) plane at 2 θ = 13.93 to a peak intensity due to the (110) plane at 2 θ = 16.68 of the scattering spectrum.
<10> Pencil hardness (abrasion resistance)
As an evaluation of the abrasion resistance of injection moldings, pencil hardness test is carried out using samples allowed to stand for 72 hours or more at 23° C. after their injection molding.
Each of the samples is fixed on a horizontal stand, and the surface of the sample is scratched with a pencil held at an angle of about 45 degrees, by pressing it on the sample surface as strong as possible but to such a degree that the lead of the pencil does not break (about 3 Kgf) and pushing out the pencil for about 1 cm in the forward direction of the tester at a regular speed (about 1 cm/s). The tip of the pencil lead is freshly sharpened after each scratching, and the test is repeated five times using a pencil of the same hardness number.
A hardness number one rank below the number by which abrasion (clear trace of the pencil) was formed two or more times among the five tests was used as the pencil hardness of the sample. In this case, pencils specified by JIS S 6006 are used in the test, a hardness number 9H is defined as the hardest pencil hardness, and the number 6B as the softest, and the harder number is used as the upper rank. Also, each pencil is sharpened to expose about 3 mm of the lead in a cylindrical form, and the lead is gently whetted by putting it at a right angle, and drawing a circle therewith, on a sheet of an abrasive paper (maximum particle size, 46 μm or less) set on a hard and even table, so that the lead tip becomes even and the corner becomes sharp.
Based on the experience, abrasion resistance is regarded as unproblematic when the pencil hardness is 2B or more.
<11> Drop impact test at −20° C. (impact resistance: As an evaluation of the impact resistance of injection moldings, a drop impact test was carried out at −20° C. by dropping a semi-spherical falling weight of 10 kg in weight and 10 cm in diameter from a height of 1 m and examining ruptured conditions of samples.
<12> Filling ability: Short shot, sink and fin of moldings were observed with the naked eye. A result which did not come under these test items was judged good.
<13> Appearance: The presence of flow marks was observed with the naked eye.

As is evident from the results shown in Tables 4 and 5, the compositions of Inventive Examples 1 to 13 of the present invention showed excellent physical properties with a b-axis orientation of 720 or more, large size thin-walled parts obtained from these compositions by injection molding showed excellent moldability and appearance and the moldings also showed superior surface hardness and impact strength.

On the contrary, the compositions of comparative examples show a b-axis orientation of less than 720, are poor in surface hardness, HDT, abrasion resistance, impact strength and the like or are poor in moldability due to insufficient MFR. In Comparative Example 1, filling for thin-wall molding was not sufficient, because MFR of the composition was outside the claimed range due to low MFR of the ethylene-propylene block copolymer. In Comparative Example 2, rigidity and surface strength are not sufficient due to low stereo-regularity of the ethylene-propylene block copolymer, thus entailing a problem with regard to the abrasion resistance of final products. In Comparative Example 3, filling for thin-wall molding was not sufficient due to low MFR of homo PP of the ethylene-propylene block copolymer. In Comparative Example 4, physical properties are poor and appearance of the molded product is also poor, because of the low ratio of the copolymer moiety in the ethylene-propylene block copolymer. In Comparative Examples 5 to 7, brittleness temperature was high showing insufficient low temperature impact resistance, because an ethylene-α-olefin copolymer was used as the thermoplastic elastomer. Also, Comparative Examples 8 to 11 show that physical properties and moldability are reduced when ratios of ethylene-propylene block copolymer and thermoplastic elastomer are outside the claimed ranges.

The same blending, pelletizing, preparation of test sample, measurement of physical properties, and each test as in the above examples were carried out except for using ethylene-propylene block copolymers shown in Table 6.

[1] Ethylene-propylene Block Copolymer (BPP)

TABLE 6

| BPP | MFR | IPF | MFR of homo PP | Cv | Propylene content of copolymer phase |
|---|---|---|---|---|---|
| (10) | 85 | 99 | 230 | 9 | 70 |
| (11) | 65 | 99 | 180 | 9 | 70 |
| (12) | 90 | 97 | 190 | 9 | 70 |
| (13) | 120 | 99 | 170 | 6 | 70 |
| (14) | 110 | 99 | 160 | 7 | 70 |
| (15) | 85 | 99 | 230 | 9 | 60 |
| (16) | 50 | 99 | 150 | 9 | 70 |
| (17) | 85 | 95 | 200 | 9 | 70 |
| (18) | 65 | 99 | 130 | 9 | 70 |
| (19) | 120 | 99 | 160 | 4 | 70 |

Note:
<1> MFR: Measured at 230° C. under a load of 2.16 kg by the procedure of ASTM D1238 (unit, g/10 minutes).
<2> Cv: The content of ethylene-propylene copolymer moiety (soluble portion in xylene at ordinary temperature) in ethylene-propylene block copolymer (unit, % by weight).
<3> IPF: Measured by $^{13}$C-NMR spectrum analysis.

Inventive Examples 14 to 28 and Comparative Examples 12 to 22

The aforementioned respective materials were formulated at the ratios shown in Tables 7 and 8, dry-blended using a Super Mixer, put into a continuous kneader (2FCM manufactured by Kobe Steel, L/D=5) and then kneaded under conditions of 200° C., 800 rpm and a discharge rate of 80 kg/hr to obtain pellets. At the time of blending, Ir 1010 (manufactured by Ciba-Geigy) and Mark 2112 (manufactured by Asahi Denka Kogyo) were added, each in 0.1 phr, as antioxidants.

Next, the thus obtained respective pellets were subjected to injection molding using an injection molding machine (NN 350 manufactured by Niigata Engineering; cylinder temperature, 210° C.; die temperature, 30° C.), thereby obtaining test pieces for use in the measurement of physical properties.

Each of the thus obtained test pieces was subjected to the measurement of physical properties and respective tests shown in the following Tables 7 and 8, with the results also shown in the tables.

In addition, using a die of an automobile bumper of t=2.5 mm (for front use, about 2.4 m in total length), a test was carried out on the evaluation of filled conditions and appearances after molding (molded using a 3500 t vertical type injection molding machine manufactured by Ube Industries at a cylinder temperature of 220° C. and at a die temperature of 40° C.), with the results also shown in Tables 7 and 8.

TABLE 7

| | | Inventive Examples | | | | | | | |
|---|---|---|---|---|---|---|---|---|---|
| | | 14 | 15 | 16 | 17 | 18 | 19 | 20 | 21 |
| Material composition | | | | | | | | | |
| BPP | Kind | (10) | (10) | (10) | (10) | (10) | (10) | (10) | (10) |
| | Wt % | 60 | 60 | 55 | 65 | 65 | 55 | 60 | 60 |
| SEBS | Kind | G1652 | G1652 | G1652 | G1652 | G1652 | G1652 | G1652 | H1042 |
| | Wt % | 20 | 10 | 24 | 17 | 20 | 20 | 20 | 20 |
| | Kind | | G1657 | | | | | | |
| | Wt % | | 10 | | | | | | |
| MT5D | Wt % | 20 | 20 | 21 | 18 | 15 | 25 | 20 | 20 |
| Physical properties | | | | | | | | | |
| MFR | g/10 min | 45 | 48 | 31 | 43 | 39 | 35 | 53 | 59 |
| Tensile elongation | % | 420 | 420 | >500 | 310 | 480 | 400 | 250 | 210 |
| Tensile yield strength | MPa | 24 | 23 | 22 | 25 | 25 | 24 | 23 | 23 |
| Modulus in flexure | MPa | 2100 | 2100 | 1900 | 2200 | 1850 | 2300 | 1900 | 2100 |
| Bending strength | MPa | 30 | 29 | 28 | 32 | 31 | 30 | 29 | 30 |
| 23° C. IZOD | J/m | 260 | 440 | 460 | 180 | 260 | 310 | 610 | 310 |
| −30° C. IZOD | J/m | 41 | 49 | 57 | 30 | 43 | 40 | 56 | 37 |
| HDT (18.5 kg) | ° C. | 75 | 74 | 73 | 75 | 73 | 78 | 73 | 74 |
| Rockwell hardness | R scale | 82 | 79 | 74 | 89 | 84 | 79 | 74 | 74 |
| Brittleness temp. | ° C. | −28 | −33 | −38 | −20 | −30 | −27 | −33 | −20 |
| b-Axis orientation | | 830 | 830 | 840 | 760 | 730 | 920 | 840 | 850 |
| Injection moldability | | | | | | | | | |
| Filling ability | | good | good | good | good | Good | good | good | good |
| Appearance | | good | good | good | good | Good | good | good | good |
| Pencil hardness | | B | B | 2B | B | 2B | B | 2B | B |
| −20° C. impact test | Rupture | no | no | no | no | No | no | no | no |

TABLE 7-continued

|  |  | Inventive Examples | | | | | | |
| --- | --- | --- | --- | --- | --- | --- | --- | --- |
|  |  | 22 | 23 | 24 | 25 | 26 | 27 | 28 |
| Material composition | | | | | | | | |
| BPP | Kind | (10) | (11) | (12) | (13) | (14) | (15) | (1) |
|  | Wt % | 60 | 60 | 60 | 60 | 60 | 60 | 60 |
| SEBS | Kind | H1052 | G1652 | G1652 | G1652 | G1652 | G1652 | G1652 |
|  | Wt % | 20 | 20 | 20 | 20 | 20 | 20 | 20 |
|  | Kind | | | | | | | |
|  | Wt % | | | | | | | |
| MT5D | Wt % | 20 | 20 | 20 | 20 | 20 | 20 | 20 |
| Physical properties | | | | | | | | |
| MFR | g/10 min | 56 | 33 | 42 | 46 | 43 | 45 | 45 |
| Tensile elongation | % | 350 | 470 | 420 | 360 | 370 | >500 | — |
| Tensile yield strength | MPa | 24 | 24 | 24 | 25 | 24 | 24 | 20 |
| Modulus in flexure | MPa | 2100 | 2100 | 2100 | 2200 | 2200 | 2100 | 1900 |
| Bending strength | MPa | 30 | 30 | 29 | 30 | 30 | 30 | 30 |
| 23° C. IZOD | J/m | 380 | 330 | 290 | 210 | 240 | 300 | 230 |
| −30° C. IZOD | J/m | 39 | 45 | 45 | 34 | 39 | 40 | 45 |
| HDT (18.5 kg) | ° C. | 74 | 74 | 75 | 76 | 75 | 74 | 79 |
| Rockwell hardness | R scale | 77 | 80 | 80 | 84 | 82 | 81 | 82 |
| Brittleness temp. | ° C. | −24 | −24 | −27 | −20 | −24 | −27 | −27 |
| b-Axis orientation | | 840 | 920 | 850 | 870 | 860 | 870 | 820 |
| Injection moldability | | | | | | | | |
| Filling ability | | good | good | good | good | good | good | Good |
| Appearance | | good | good | good | good | good | good | Good |
| Pencil hardness | | B | B | B | B | B | B | B |
| −20° C. impact test | Rupture | no | no | no | no | no | no | no |

TABLE 8

|  |  | Comparative Examples | | | | | | | | | | |
| --- | --- | --- | --- | --- | --- | --- | --- | --- | --- | --- | --- | --- |
|  |  | 12 | 13 | 14 | 15 | 16 | 17 | 18 | 19 | 20 | 21 | 22 |
| Material composition | | | | | | | | | | | | |
| BPP | Kind | (16) | (17) | (18) | (19) | (10) | (10) | (10) | (10) | (10) | (10) | (10) |
|  | Wt % | 60 | 60 | 60 | 60 | 60 | 60 | 60 | 50 | 70 | 65 | 55 |
| SEBS | Kind | G1652 | G1652 | G1652 | G1652 | G1652 | EP9615P | EP916SP | G1652 | G1652 | G1652 | G1652 |
|  | Wt % | 20 | 20 | 20 | 20 | 10 | 10 | 10 | 20 | 30 | 10 | 25 | 15 |
|  | Kind | | | | | EP961SP | EBM2011P | | | | | |
|  | Wt % | | | | | 10 | 10 | | | | | |
| MT5D | Wt % | 20 | 20 | 20 | 20 | 20 | 20 | 20 | 20 | 20 | 10 | 30 |
| Physical properties | | | | | | | | | | | | |
| MFR | g/10 min | 26 | 45 | 33 | 47 | 34 | 32 | 29 | 24 | 57 | 33 | 42 |
| Tensile elongation | % | >500 | >500 | 450 | 300 | 220 | 200 | 50 | >500 | 190 | >500 | 180 |
| Tensile yield strength | MPa | 25 | 23 | 23 | 25 | 24 | 25 | 25 | 19 | 28 | 23 | 27 |
| Modulus in flexure | MPa | 2100 | 1700 | 2200 | 2400 | 2200 | 2300 | 2300 | 1500 | 2800 | 1400 | 3000 |
| Bending strength | MPa | 31 | 27 | 30 | 32 | 30 | 31 | 30 | 25 | 35 | 24 | 33 |
| 23° C. IZOD | J/m | 380 | 300 | 350 | 180 | 190 | 230 | 130 | 620 | 140 | 500 | 140 |
| −30° C. IZOD | J/m | 42 | 44 | 44 | 33 | 36 | 37 | 34 | 60 | 21 | 60 | 21 |
| HDT (18.5 kg) | ° C. | 74 | 72 | 74 | 78 | 73 | 70 | 73 | 66 | 74 | 66 | 86 |
| Rockwell hardness | R scale | 82 | 76 | 80 | 87 | 81 | 82 | 79 | 62 | 92 | 71 | 86 |
| Brittleness temp. | ° C. | −31 | −28 | −24 | −17 | −33 | −5 | 3 | −41 | 0 | −41 | 0 |
| b-Axis orientation | | 690 | 550 | 690 | 740 | 770 | 750 | 740 | 740 | 740 | 620 | 830 |
| Injection moldability | | | | | | | | | | | | |
| Filling ability | | short | good | short | good | good | sink | sink | short | good | good | Good |
| Appearance | | flow mark | good | flow mark | good | good | good | good | flow mark | flow mark | good | flow mark |

TABLE 8-continued

|  |  | Comparative Examples | | | | | | | | | |
|---|---|---|---|---|---|---|---|---|---|---|---|
|  |  | 12 | 13 | 14 | 15 | 16 | 17 | 18 | 19 | 20 | 21 | 22 |
| Pencil hardness |  | B | 4B | B | B | B | B | B | 4B | HB | 3B | B |
| −20° C. impact test | Rupture | no | no | no | yes | yes | yes | yes | no | yes | no | yes |

Note:
<1> MFR: Measured at 230° C. under 2.16 kg load by the procedure of ASTM D1238 (unit, g/10 minutes).
<2> Tensile elongation: Measured by the procedure of ASTM D638 (unit, %).
<3> Tensile yield strength: Measured by the procedure of ASTM D638 (unit, MPa).
<4> Modulus in flexure: Measured by the procedure of ASTM D790 (unit, MPa).
<5> Bending strength: Measured by the procedure of ASTM D790 (unit, MPa).
<6> Izod impact strength: Measured at 23° C. and −30° C. by the procedure of ASTM D256 (unit, J/m).
<7> Heat distortion temperature (HDT): Measured under load of 18.5 kg/cm$^2$ by the procedure of ASTM D648 (unit, ° C.).
<8> Rockwell hardness: Measured by the procedure of ASTM D785 (scale, R).
<9> Brittleness temperature: Measured by the procedure of ASTM D746 (unit, ° C.)
<10> b-Axis orientation: Central part of an ASTM No. 1 dumbbell test piece obtained by injection molding is analyzed by wide-angle X-ray diffraction. The orientation was calculated from the ratio of a peak intensity due to the (040) plane at 2 θ = 13.93 to a peak intensity due to the (110) plane at 2 θ = 16.68 of the scattering spectrum.
<11> Pencil hardness (abrasion resistance)
As an evaluation of the abrasion resistance of injection moldings, pencil hardness test is carried out using samples allowed to stand for 72 hours or more at 23° C. after their injection molding.
Each of the samples is fixed on a horizontal stand, and the surface of the sample is scratched with a pencil held at an angle of about 45 degrees, by pressing it on the sample surface as strong as possible but to such a degree that the lead of the pencil does not break (about 3 Kgf) and pushing out the pencil for about 1 cm in the forward direction of the tester at a regular speed (about 1 cm/s). The tip of the pencil lead is freshly sharpened after each scratching, and the test is repeated five times using a pencil of the same hardness number.
A hardness number one rank below the number by which abrasion (clear trace of the pencil) was formed two or more times among the five tests was used as the pencil hardness of the sample. In this case, pencils specified by JIS S 6006 are used in the test, a hardness number 9H is defined as the hardest pencil hardness, and the number 6B as the softest, and the harder number is used as the upper rank. Also, each pencil is sharpened to expose about 3 mm of the lead in a cylindrical form, and the lead is gently whetted by putting it at a right angle, and drawing a circle therewith, on a sheet of an abrasive paper (maximum particle size, 46 μm or less) set on a hard and even table, so that the lead tip becomes even and the corner becomes sharp. Based on the experience, abrasion resistance is regarded as unproblematic when the pencil hardness is 2B or more.
<12> Drop impact test at −20° C. (impact resistance): As an evaluatin of the impact resistance of injection moldings, a drop impact test was carried out at −20° C. by dropping a semi-spherical falling weight of 10 kg in weight and 10 cm in diameter from a height of 1 m and examining ruptured conditions of samples.
<13> Filling ability: Short shot, sink and fin of moldings were observed with the naked eye. A result which did not come under these test items was judged good.
<14> Appearance: The presence of flow marks was observed with the naked eye.

As is evident from the results shown in Tables 7 and 8, the compositions of Inventive Examples 14 to 28 of the present invention showed excellent physical properties with a b-axis orientation of 720 or more, large size thin-walled parts obtained from these compositions by injection molding showed excellent moldability and appearance and the moldings also showed superior surface hardness and impact strength.

On the contrary, the compositions of comparative examples show a b-axis orientation of less than 720, are poor in surface hardness, HDT, abrasion resistance, impact strength and the like or are poor in moldability due to insufficient MFR. In Comparative Example 12, filling for thin-wall molding was not sufficient, because MFR of the composition was outside the claimed range due to low MFR of the ethylene-propylene block copolymer. In Comparative Example 13, rigidity and surface strength are not sufficient due to low stereo-regularity of the ethylene-propylene block copolymer, thus entailing a problem with regard to the abrasion resistance of final products. In Comparative Example 14, filling for thin-wall molding was not sufficient due to low MFR of homo PP of the ethylene-propylene block copolymer. In Comparative Example 15, physical properties are poor and appearance of the molded product is also poor, because of the low ratio of the copolymer moiety in the ethylene-propylene block copolymer. In Inventive Example 28, tensile elongation is small due to low propylene content in the copolymer moiety of the ethylene-propylene block copolymer. In Comparative Examples 16 to 18, brittleness temperature was high showing insufficient low temperature impact resistance, because an ethylene-α-olefin copolymer was used as the thermoplastic elastomer. Also, Comparative Examples 19 to 22 show that physical properties and moldability are reduced when ratios of ethylene-propylene block copolymer and thermoplastic elastomer are outside the claimed ranges.

Thus, as has been described in the foregoing, the polypropylene resin composition of the present invention has excellent moldability and well-balanced mechanical properties. In consequence, the range of injection molding conditions can be expanded so that molding of thin-walled large size products becomes particularly easy.

The composition of the present invention therefore is useful in automobile interior and exterior parts, domestic electrical components and the like products which are obtained by the injection molding of industrial materials.

What is claimed is:

1. A polypropylene resin composition which comprises:
   (A) 54 to 65% by weight of a crystalline ethylene-propylene block copolymer having a melt flow rate (MFR) of from 60 to 120 g/10 minutes, wherein the crystalline ethylene-propylene block copolymer comprises a homopolypropylene moiety and an ethylene-propylene copolymer moiety, wherein the homopolypropylene moiety has an isotactic pentad fraction value of 96% or more and an MFR value of from 150 to 250 g/10 minutes and the ratio of the ethylene-propylene copolymer moiety is from 5 to 10% by weight based on the total of the homopolypropylene moiety and the ethylene-propylene copolymer moiety;
   (B) 17 to 24% by weight of a thermoplastic elastomer comprising at least one styrene-ethylene.butylene-styrene block copolymer; and
   (C) 15 to 25% by weight of talc,
wherein the propylene resin composition has the following mechanical properties when measured in accordance with the procedures of ASTM:

modulus in flexure≧1,800 MPa;

tensile yield strength≧20 MPa;

Izod impact strength at 23° C.≧180 J/m;

Izod impact strength at −30° C.≧30 J/m;

Rockwell hardness (R scale)≧74;

heat distortion temperature (HDT, 18.5 kg)≧73° C.;

brittleness temperature≦−20° C.; and

MFR=30 to 60 g/10 minutes, and wherein the propylene resin composition has a degree of b-axis orientation of 720 or more which is calculated from the ratio of differential peak intensities by wide-angle X-ray diffraction of the central area of an ASTM No. 1 dumbbell prepared by injection molding.

2. A polypropylene composition according to the polypropylene resin composition of claim 1, wherein the propylene content of the ethylene-propylene block copolymer moiety is from 60 to 70% by weight.

3. A polypropylene composition according to the polypropylene resin composition of claim 1, wherein the talc has an average particle size of 5 µm or less.

4. The polypropylene resin composition according to claim 1, which has an MFR value of from 40 to 60 g/10 minutes.

5. The polypropylene resin composition according to claim 1, which has a tensile elongation of 200% or more.

* * * * *